(12) United States Patent
Dupont et al.

(10) Patent No.: US 9,032,408 B2
(45) Date of Patent: May 12, 2015

(54) SYSTEM AND METHOD FOR INTELLIGENT TIMER SERVICES

(75) Inventors: Andre Dupont, St-Laurent (CA); Thierry DeCorte, Laval (CA)

(73) Assignee: Accedian Networks Inc., Saint-Laurent, Quebec (CA)

( * ) Notice: Subject to any disclaimer, the term of this patent is extended or adjusted under 35 U.S.C. 154(b) by 259 days.

(21) Appl. No.: 13/606,089

(22) Filed: Sep. 7, 2012

(65) Prior Publication Data

US 2014/0075238 A1      Mar. 13, 2014

(51) Int. Cl.
| | | |
|---|---|---|
| G06F 9/455 | (2006.01) | |
| G06F 9/46 | (2006.01) | |
| G06F 9/48 | (2006.01) | |
| G06F 1/14 | (2006.01) | |

(52) U.S. Cl.
CPC ............ *G06F 9/4881* (2013.01); *G06F 9/4825* (2013.01); *G06F 1/14* (2013.01)

(58) Field of Classification Search
None
See application file for complete search history.

(56) References Cited

U.S. PATENT DOCUMENTS 5,838,957 A * 11/1998 Rajaraman et al. ........... 713/502
6,718,479 B1 * 4/2004 Christenson .................. 713/502

OTHER PUBLICATIONS

"Hashed and Hierarchical Timing Wheels: Efficient Data Structures for Implementing a Timer Facility", by George Varghese and Anthony Lauck, in IEEE/ACM Transactions on Networking, vol. 5, Dec. 1997.*
Rate-based Real-Time Scheduler for the Linux kernel on multicore systems, Released for LKML, Master Thesis TTK4900, Dedicated Computer Systems, by Henrik Austad, Norweigian University of Science and Technology, Department of Engineering Cybernetics, Jul. 10, 2009 (171 pages).
Hrtimers and Beyond: Transforming the Linux Time Subsystems, by Thomas Gleixner and Douglas Niehaus, Proceedings of the Linux Symposium, vol. One, Jul. 19-22, 2006, Ottawa, Ontario, Canada (16 pages).
Kernel/timer.c Design, Roman Zippel, from https://org/lkml/2005/10/19/46, Oct. 19, 2005 (7 pages).

* cited by examiner

*Primary Examiner* — Lewis A Bullock, Jr.
*Assistant Examiner* — Mark Gooray
(74) *Attorney, Agent, or Firm* — Nixon Peabody LLP (57) ABSTRACT

A method is provided for efficiently scheduling timer events within an operating system by allocating a plurality of timers, each of which has an expiry time, to a set of available timer slots. The method defines a timer spread value that denotes the allowed variance of the expiry times of each of the timers, calculates a set of available timer slots for each of the timers based on the timer spread value, and adjusts the expiry times of the timers so as to insert and evenly spread the timers across the set of available timer slots. In one implementation, the set of available timer slots is located in a timer wheel existing within the operating system, and the timer wheel uses a plurality of timer vectors arranged into successively increasing levels, beginning with level zero.

20 Claims, 5 Drawing Sheets

SYSTEM AND METHOD FOR INTELLIGENT TIMER SERVICES

FIELD OF THE INVENTION

The present invention relates to efficiently scheduling timer events within an Operating System (OS).

BACKGROUND OF THE INVENTION

Typical real-time OS implementations offer various timer services that can be used for a variety of applications and services. These timers can be used to trigger events such as notifications, alerts and signals.

Some recent protocols require a very large number of timers with relatively small periods along with timer or periodic events with significantly longer periods. The context switching associated with the handling of these timers can overwhelm most OS very quickly, especially when the capabilities of the hardware platform cannot be expanded for various reasons, including but not limited to cost.

Another problem area occurs when multiple timers (periodic or not) are set to expire at the exact same time, although they belong to unrelated processes, services or applications. The state of the art approach often results in peaks of timer activity followed by relatively quiet periods for the next immediate timer tick.

An example of the existing state of the art in timer distribution is given below: When a timer is created, the timer tick period specified in microseconds or nanoseconds (as it is defined by the operating system) is converted into the corresponding number of OS ticks. A calculation is then made to insert this tick value into the proper slot at the proper level. For example, in the case where the timer tick period, that is the time between successive ticks of the timer or successive timeouts is 5000 μs (microseconds), and the OS tick period is equal to 1666 μs, timer_tick period=5000 μs $t$=1666 μs (OS tick period)

Figure 1:
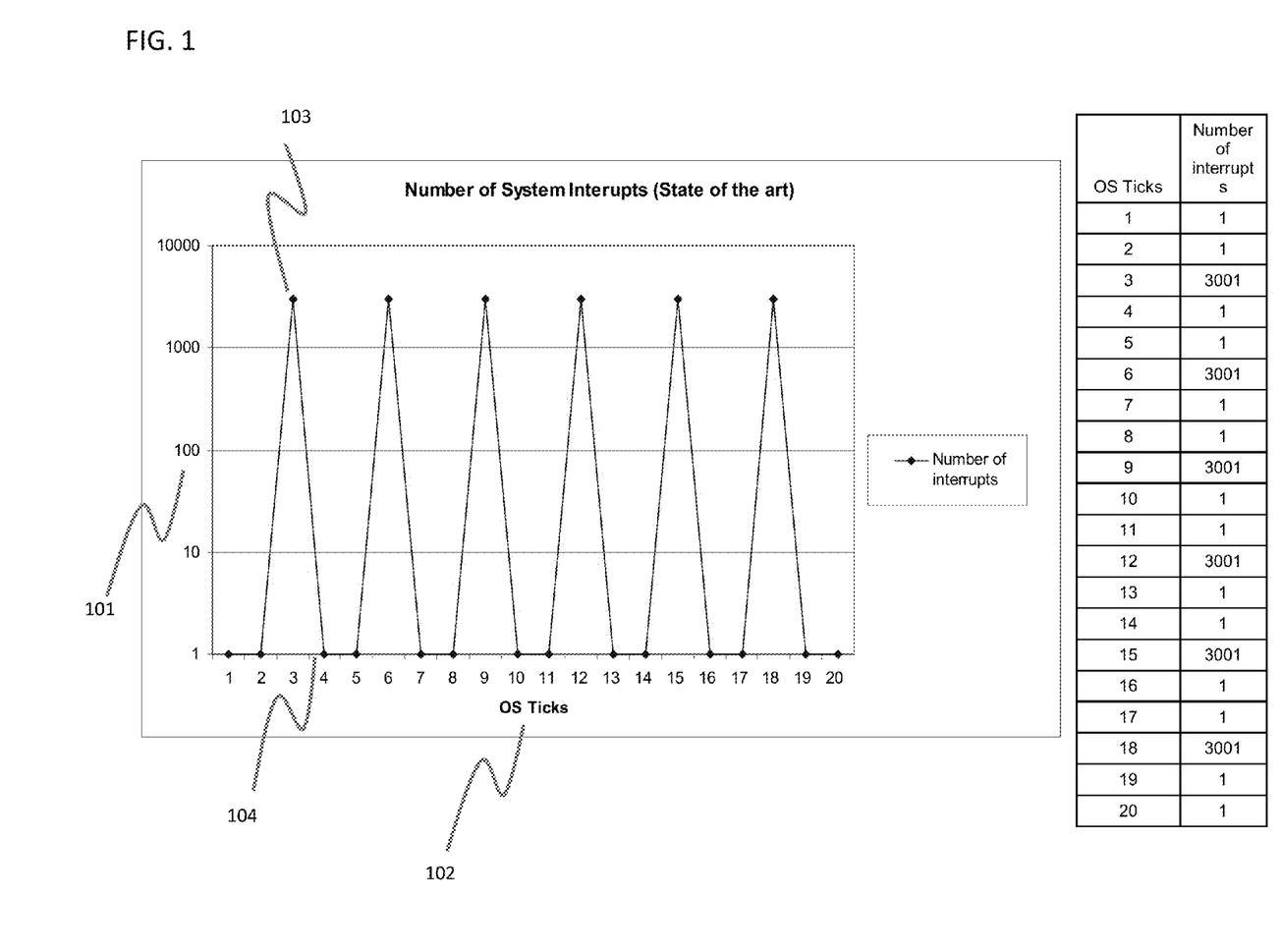
FIG. 1 illustrates a graphic example of a typical timer distribution in time.

$t$_tick=time_value/$t$ then $t$_tick=5000/1666=3 ticks that is, the timer would have to be triggered every 3 OS ticks FIG. 1 shows the distribution of timers assuming that there are 3000 of these 3-OS-tick timers. When examining the number of interrupts 101 calculated over time in OS ticks 102, it can be seen that while normally the system has only 1 interrupt per tick, during a slot from the set of slots {3, 6, 9 . . . } the interrupt per tick spikes to 3001. This means that the system has large peaks of activity 103 with low points of inactivity 104. This leads to very high workloads (perhaps more than can be handled) in one OS tick for the system at peak 103 and relatively little work at point 104.

There is therefore a need to smooth out these timer events over a slightly larger period of time to achieve a more efficient use of the OS resources without affecting the overall adherence to standards, the quality of service or the overall quality of experience.

SUMMARY

In accordance with one embodiment, a method is provided for efficiently scheduling timer events within an operating system by allocating a plurality of timers, each of which has an expiry time, to a set of available timer slots. The method defines a timer spread value that denotes the allowed variance of the expiry times of each of the timers, calculates a set of available timer slots for each of the timers based on the timer spread value, and adjusts the expiry times of the timers so as to insert and evenly spread the timers across the set of available timer slots. In one implementation, the set of available timer slots is located in a timer wheel existing within the operating system, and the timer wheel uses a plurality of timer vectors arranged into successively increasing levels, beginning with level zero.

Each timer vector may contain a plurality of timer slots defined by a slot size based on the level of the timer vector, the timer slots being evenly spaced by a number of timer ticks corresponding with the slot size. The slot size for the lowest level timer vector may be set to one, with the slot size for each successive higher level timer vector being based on the slot size of the level of the preceding timer vector. Calculating the set of available timer slots may include applying a maximum positive spread and a maximum negative spread, and the sum of the maximum positive spread and the maximum negative spread may be equal to the calculated timer spread value. The maximum positive spread and the maximum negative spread may also be equal to each other.

One of the timers may be a periodic timer, which does not elapse earlier than the original unadjusted expiry time, and calculating the set of available timer slots includes applying a maximum positive spread and a maximum negative spread, where the maximum negative spread is zero, and upper bounding the set of available slots.

In one embodiment, adjusting the expiry times further includes selecting from the set of available timer slots a slot containing the fewest number of existing timers and/or adjusting the expiry times further comprises selecting a timer slot randomly from the set of available slots.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The specification details a system and method to distribute timers in order to reduce the overhead due to processing tasks generated on ticks of timers.

This system and method can be applied to non-periodic as well as periodic timers. A periodic timer is repeatedly triggered over a period of time with the same timing interval. For instance, a periodic timer may be aligned with the system Real Time Clock (RTC) and triggered every 15 minutes, that is, the timing interval is 15 minutes. A non-periodic timer may be set to elapse at any point in time and is not repeatedly triggered with the same period. For instance, a session recovery timer may be set to elapse after 10 minutes of inactivity and will be restarted before it elapses as long as activity is detected during the timeout period.

Figure 2:
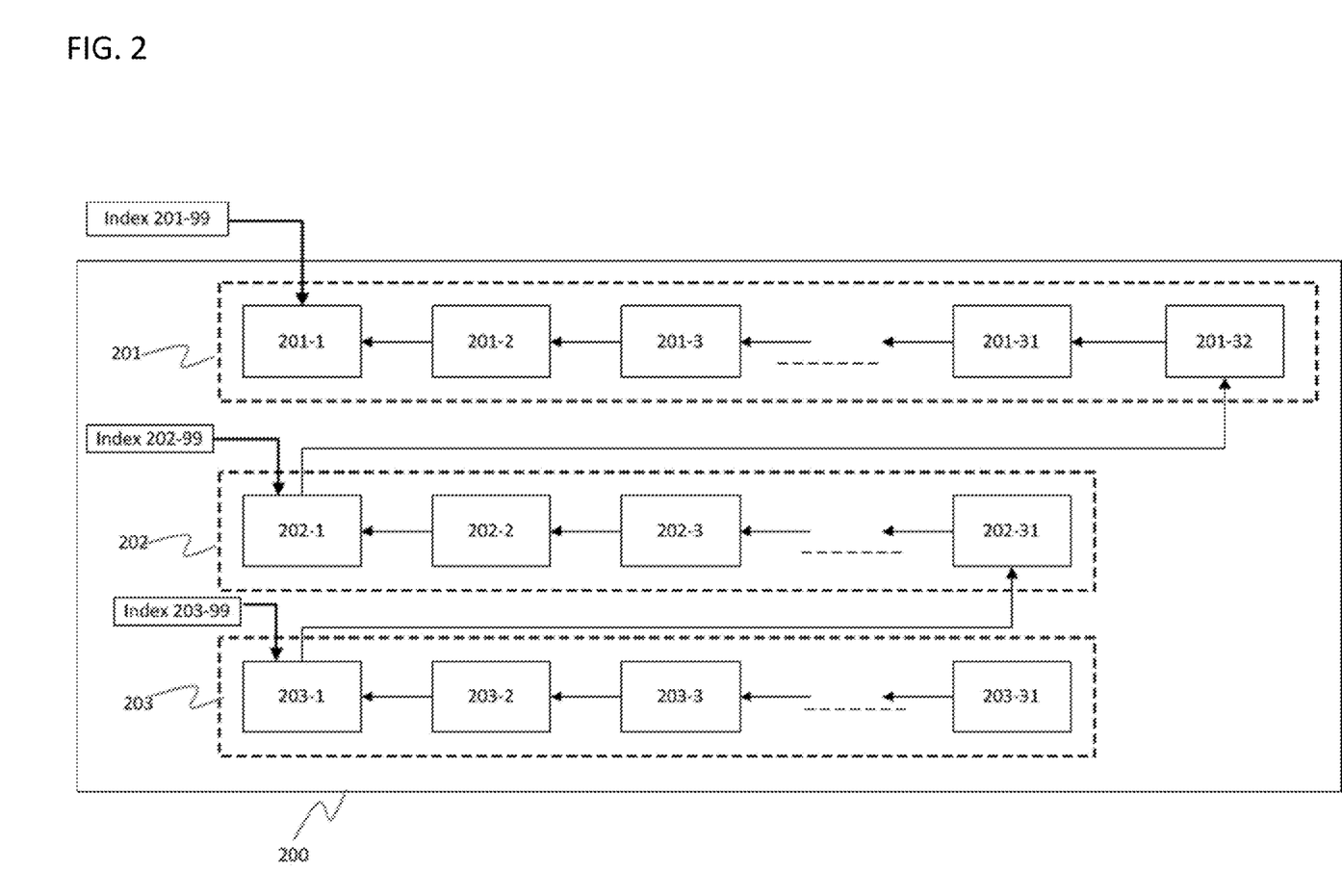
FIG. 2 illustrates a Timer wheel for N=32.

In FIG. 2, a Timer Wheel (TW) 200 is shown. The aim of a TW is to reduce the number of entries in a list of timer by aggregating timers based on the number of ticks before they elapse. There are different levels of timer vectors, and the slot size for each timer vector depends on the level.

In general, the slot sizes in a TW are given by the following: For a timer vector level zero, or a timer vector zero, the slot size is 1. For timer vectors with level higher than zero:

$$\text{Slot size} = \Pi_{i=1}^{i=\text{Timer Vector Level}} N_i$$

where $N_i$=slot multiplier for Timer Vector Level i

For example, if $N_1$=32, then the slot size for timer vector 1 is 32. If $N_2$ is 48, then the slot size for timer vector 2 is $N_1 \times N_2 = 32 \times 48 = 1536$.

In one embodiment, $N_i$=N, that is the slot multiplier for all the levels is N. Then the slot sizes are given by the following relationship:

$$\text{Slot Size(Timer Vector Level)} = N^{(\text{Timer Vector Level})}$$

While the remainder of this specification discusses the case where $N_i$=N, this discussion can be equally applied to the general case as well.

Timers that are due to elapse at the next 1 to N ticks are stored in timer vector zero. Since the slot size in timer vector zero is 1, there are N slots in timer vector zero.

Timers due to elapse at a number of ticks greater than N ticks are stored in other timer vectors. For instance, timer vector one is used to store all timers due to elapse at the next (N+1) to $N^2$ timer ticks, where the slot size of timer vector one is N ticks. There are (N−1) slots in timer vector one. Timer vector 2 is used to store all timers due to elapse at the next ($N^2$+1) to $N^3$ ticks and are spaced every $N^2$ ticks. Similarly there are (N−1) slots in timer vector two.

When a new timer is defined (started), first the timer is designated as periodic or non-periodic. Then the timer interval is specified in microseconds (or nanoseconds if the hardware platform supports this resolution). The timer interval is converted into a number of ticks using the same approach as previously described, that is:

$$t\_tick = timer\_tick/t$$

where
timer_tick=timer interval
t=OS tick period
t_tick=timer interval in number of OS ticks Then, the t_tick of the timer is compared to the range of ticks occupied by each timer vector, and finally each slot in the timer vector to appropriately place it. If the timer level is greater than zero, then the remainder is calculated by subtracting the lower edge of the selected slot from t_tick.

Each timer vector contains an index which represents the current slot inside of the timer vector. The index for a vector indicates that the timers contained within the slot pointed to by the index will expire at the next tick. The timers contained within the slot are to be processed, and any new timer to be inserted in a given timer vector shall be inserted at the calculated offset from the current value of the index for a timer vector.

Because of the relationship between timer vectors, a higher timer vector will increment its own index when the index of the preceding timer vector has gone through all of its slots. Timer vector zero increases its index at each timer tick. Timer vector one increases its index after N ticks of timer vector zero and timer vector two increases its index after N ticks of timer vector one corresponding to $N^2$ ticks of timer vector zero. When the index is equal to N, at the next tick the index is reset to 1.

In one embodiment, the TW is implemented using an array of pointers. Each pointer within the array points to a slot. The index of the timer vector is used to reference the array, and is incremented at every tick. Then, when the index reaches the end of the array, it is returned to the start at the next tick. In another embodiment, the TW is implemented using a circular linked list. Then, the index will "wrap around" to point to the slot it pointed to N ticks ago.

Every time an index is increased in a timer vector, the timers in the specific slot pointed to by the index are triggered if they belong to timer vector zero. If the timers are in another higher level timer vector, then when the index is increased, the remainder tick value of the timer is then checked to see if it will expire at the next tick, that is, the number of remaining ticks is 0. Otherwise, the timer needs to be moved to a lower-level timer vector and slot.

So, in timer vector zero, all timers in the first slot will elapse at the next timer tick. Timers in the next slot will elapse in 2 timer ticks and so on for the other slots in timer vector zero. In timer vector one, every N timer ticks, all of the timers in the slot of timer vector one at the current index for that timer vector will have their remainders checked to see if it will expire at the next tick, that is, the number of remaining ticks is 0. If not, they are moved to timer vector zero, and placed in a slot corresponding to the remainder.

In timer vector two, every $N^2$ timer ticks, all of the timers in the slot of timer vector one at the current index for that timer vector will have their remainders checked to see if it will expire at the next tick, that is, the number of remaining ticks is 0. If not, they are moved either to timer vector one or timer vector zero, and placed in a slot corresponding to the remainder. The same is carried out for timer vectors at the higher levels.

A TW may be defined with the required number of timer vectors to handle the largest timer value allowed by the OS.

Consider the case where N=32. Then, slot size in timer vector zero is 1, slot size in timer vector one is $32^1$=32, and in timer vector two it is $32^2$=1024.

FIG. 2 shows an example TW 200 for N=32. Timer vector 201 corresponds to timer vector zero; timer vector 202 corresponds to timer vector one; and timer vector 203 corresponds to timer vector two. Timer vector 201 will store timers due to elapse in the next 32 ticks. Timer vector 202 will store timers due to elapse in the next 32 to 1023 ticks. Timer vector 203 will store timers due to elapse in the next 1024 to 32767 ticks.

Assuming N =32, Table 1 shows the number of ticks remaining for each of the slots in timer vector 201, Table 2 shows the number of ticks remaining for each of the slots in timer vector 202, and Table 3 shows the number of ticks remaining for each of the slots in timer vector 203. Looking at Table 1 below, slot 201-1 of timer vector 201 represents the slot at the current index value and slot 201-5 represents the slot at the (current index value +4) position. The same is applicable for each timer vector. In the tables below, zero ticks remaining indicates that the timer will expire at the next tick, 1 tick remaining indicates that the timer will expire at the 2nd tick after the current instant, and so on.

TABLE 1

Slots for Timer Vector 201

| Slot | Number of ticks remaining |
|---|---|
| 201-1 | 0 |
| 201-2 | 1 |
| 201-3 | 2 |
| 201-4 | 3 |
| 201-5 | 4 |
| 201-6 | 5 |
| 201-7 | 6 |
| 201-8 | 7 |
| 201-9 | 8 |
| 201-10 | 9 |
| 201-11 | 10 |
| 201-12 | 11 |
| 201-13 | 12 |
| 201-14 | 13 |
| 201-15 | 14 |
| 201-16 | 15 |
| 201-17 | 16 |
| 201-18 | 17 |
| 201-19 | 18 |
| 201-20 | 19 |
| 201-21 | 20 |
| 201-22 | 21 |
| 201-23 | 22 |
| 201-24 | 23 |
| 201-25 | 24 |
| 201-26 | 25 |
| 201-27 | 26 |
| 201-28 | 27 |
| 201-29 | 28 |
| 201-30 | 29 |
| 201-31 | 30 |
| 201-32 | 31 |

TABLE 2

Slots for Timer Vector 202

| Slot | Lower Edge | Upper Edge |
|---|---|---|
| 202-1 | 32 | 63 |
| 202-2 | 64 | 95 |
| 202-3 | 96 | 127 |
| 202-4 | 128 | 159 |
| 202-5 | 160 | 191 |
| 202-6 | 192 | 223 |
| 202-7 | 224 | 255 |
| 202-8 | 256 | 287 |
| 202-9 | 288 | 319 |
| 202-10 | 320 | 351 |
| 202-11 | 352 | 383 |
| 202-12 | 384 | 415 |
| 202-13 | 416 | 447 |
| 202-14 | 448 | 479 |
| 202-15 | 480 | 511 |
| 202-16 | 512 | 543 |
| 202-17 | 544 | 575 |
| 202-18 | 576 | 607 |
| 202-19 | 608 | 639 |
| 202-20 | 640 | 671 |
| 202-21 | 672 | 703 |
| 202-22 | 704 | 735 |
| 202-23 | 736 | 767 |
| 202-24 | 768 | 799 |
| 202-25 | 800 | 831 |
| 202-26 | 832 | 863 |
| 202-27 | 864 | 895 |
| 202-28 | 896 | 927 |
| 202-29 | 928 | 959 |
| 202-30 | 960 | 991 |
| 202-31 | 992 | 1023 |

TABLE 3

Slots for Timer Vector 203

| Slot | Lower Edge | Upper Edge |
|---|---|---|
| 203-1 | 1024 | 2047 |
| 203-2 | 2048 | 3071 |
| 203-3 | 3072 | 4095 |
| 203-4 | 4096 | 5119 |
| 203-5 | 5120 | 6143 |
| 203-6 | 6144 | 7167 |
| 203-7 | 7168 | 8191 |
| 203-8 | 8192 | 9215 |
| 203-9 | 9216 | 10239 |
| 203-10 | 10240 | 11263 |
| 203-11 | 11264 | 12287 |
| 203-12 | 12288 | 13311 |
| 203-13 | 13312 | 14335 |
| 203-14 | 14336 | 15359 |
| 203-15 | 15360 | 16383 |
| 203-16 | 16384 | 17407 |
| 203-17 | 17408 | 18431 |
| 203-18 | 18432 | 19455 |
| 203-19 | 19456 | 20479 |
| 203-20 | 20480 | 21503 |
| 203-21 | 21504 | 22527 |
| 203-22 | 22528 | 23551 |
| 203-23 | 23552 | 24575 |
| 203-24 | 24576 | 25599 |
| 203-25 | 25600 | 26623 |
| 203-26 | 26624 | 27647 |
| 203-27 | 27648 | 28671 |
| 203-28 | 28672 | 29695 |
| 203-29 | 29696 | 30719 |
| 203-30 | 30720 | 31743 |
| 203-31 | 31744 | 32767 |

Referring again to FIG. 2, at the next timer tick, timer vector 201 increases its index 201-99 by one. Then index 201-99 will be moved to point to slot 201-2. After N ticks of timer vector 201, all of the timers in slot 202-1 (indexed by 202-99) will be moved to timer vector 201. The timers will be moved to an appropriate slot in timer vector 201 using the calculated remainder of each timer in the slot unless the calculated remainder is zero where the timer will be triggered immediately. Index 201-99 will return to point to slot 201-1. Timer vector 202 will then increase its index 202-99 by one.

After (N−1) ticks of timer vector 202, all of the timers in slot 203-1 (indexed by 203-99) will be moved to an appropriate slot in either timer vector 201 or timer vector 202 using the calculated remainder of each timer in the slot unless the calculated remainder is zero where the timer will be triggered immediately. Index 202-99 will return to point to slot 202-1. Timer vector 203 increases its index 203-99 by one, corresponding to $N^2$ ticks of timer vector 201. After (N−1) ticks of timer vector 203, corresponding to the number of slots in timer vector 201, index 203-99 will return to point to slot 203-1.

Figure 2A:
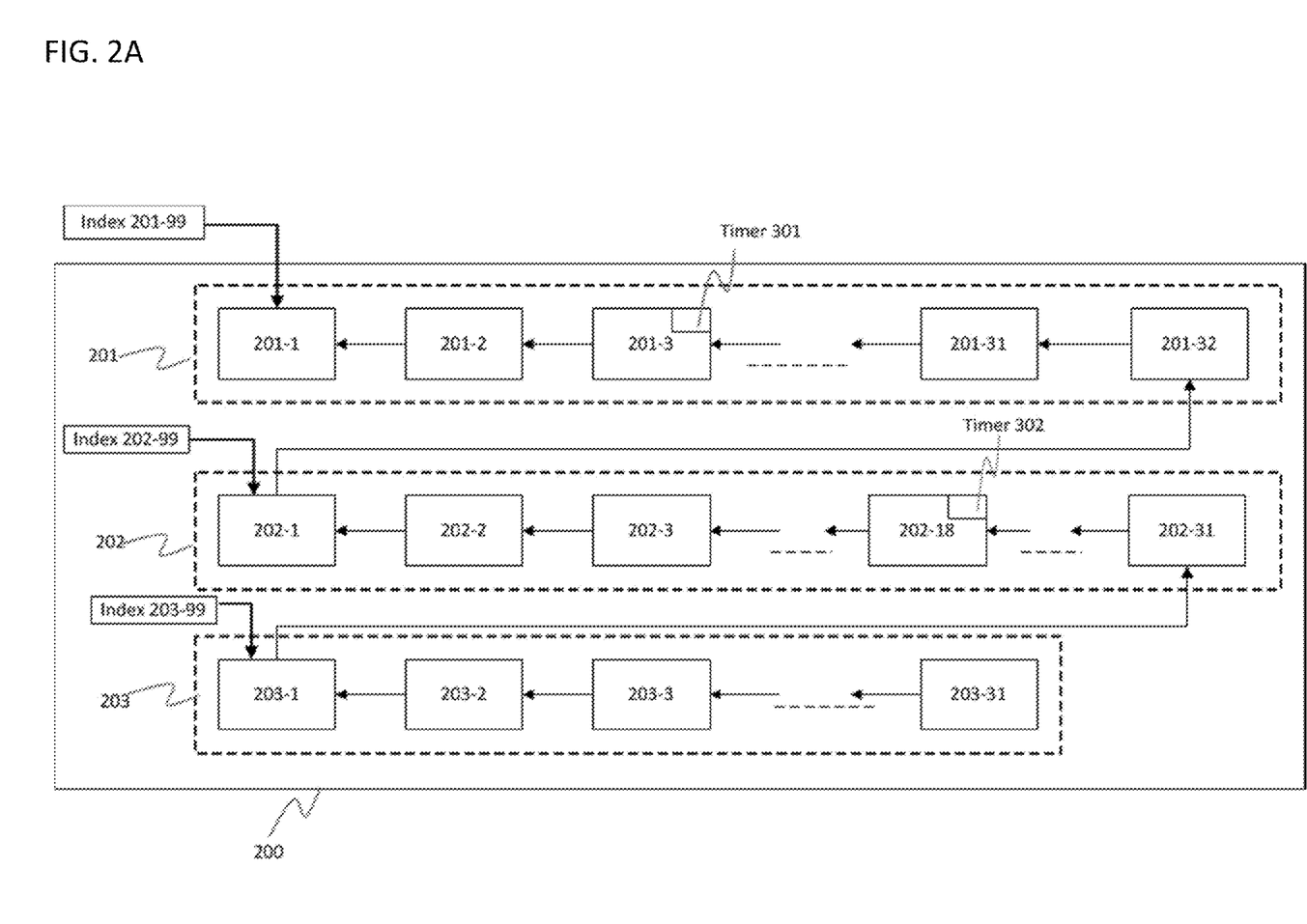
FIG. 2A illustrates the placing of timers 301 and 302 within the Timer wheel.

FIG. 2A shows 2 example timers 301 and 302. Consider timer 301 with duration of 3333 µs. Then:

timer_tick period=3333 µs $t$=1666 µs (OS tick period)

$t$_tick=time_value/$t$ then $t$_tick=3333/1666=2 ticks

Consider timer 302 with a duration of 1000123 microseconds:

timer_tick period=1000123 µs $t$=1666 µs (OS tick period)

$t$_tick=time_value/$t$ then $t$_tick=1000123/1666=600 ticks

Then, the t_tick of the timer is compared to the range of ticks occupied by each timer vector, and finally each slot in the timer vector to appropriately place it. For example, since 2 ticks falls between 1 and 32 ticks, timer 301 is first placed in timer vector 201, and then in slot 201-3. Timer 302 is first placed in timer vector 202, since 600 falls between 32 and 1023 ticks, then in slot 202-18, which contains timers in the range 576 to 607 ticks remaining, as shown in FIG. 2A.

Additionally, if it is periodic, the length of time during which the timer will be repeatedly triggered is specified.

For timer 302, the remainder is then calculated. This is given by deducting the lower edge of the current slot from t_tick. In this case, as shown in Table 2 the lower edge of the current slot 202-18 is 576, and t_tick is 600. Then the remainder is 24 ticks.

After 32 ticks have elapsed, the index advances by one in timer vector 202. After 576 timer ticks elapse, the timer will be transferred into slot 201-25 of timer vector 201 since there remains another 24 timer ticks before the timer is due to elapse.

A TW is an efficient implementation to reduce the time needed to process a large number of timers, but in itself, it does not address the issue raised as shown in FIG. 1 where the expiry of timers often occurs at the exact same time resulting in peaks of processing followed by significantly less busy periods. It is therefore useful to spread the elapsing of timers over an acceptable range to reduce the peak levels. The range of spreading is system dependent and may depend on the granularity of timers (duration of a timer tick) and the applications using these timers.

By combining the TW method with a load balancing/timer spreading method, it is possible to significantly improve the scheduling of timer events and the overall performance of the system without adding a significant burden or delay to the period of a timer. For instance, when implementing certain functions, it is possible to handle a very large number of concurrent timer requests (in the order of several thousands and potential more) while being able to handle very short timeouts of a few milliseconds.

In one embodiment the spreading of the timers inside a TW takes place when timers are down to the lowest granularity since timers with higher granularity have a significantly longer timeout left and are therefore not about to be triggered. For example, based on FIG. 2, timers in a higher timer vector (202 and 203) due to expire in more than 32 ticks become candidates for being spread once they are ready to be moved to a slot in timer vector 201.

Figure 2B:
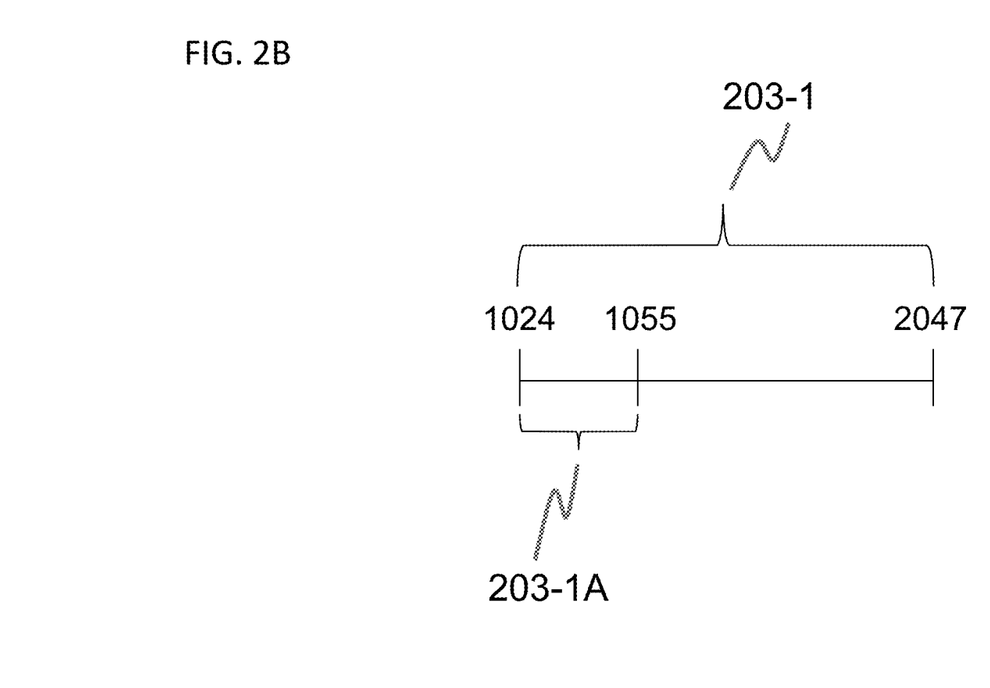
FIG. 2B illustrates a sub-slot for slot 203-1.

In another embodiment, a sub-slot of size N ticks is created within a slot of a higher timer vector, as shown in FIG. 2B. The lower edge of the sub-slot corresponds to the lower edge of the slot. For example, consider slot 203-1, as shown in FIG. 2B. From Table 2 this slot corresponds to 1024 to 2047 ticks remaining. Then, the lower edge of sub-slot 203-1A is 1024, and the sub-slot range is from 1024 to (N +1023) or 1055 ticks remaining.

Consider slot 202-1, which according to Table 1 contains timers with 32 to 63 ticks remaining. In this case the sub-slot occupies all of slot 202-1.

When the timer is first placed into the slot, the t_tick corresponding to each timer is checked against the upper edge of the sub-slot, to see whether the timer falls into this sub-slot. If the timer falls into this sub-slot, then the timer is a candidate for spreading. This way, the system does not wait until the timer falls into the lowest granularity timer vector before carrying out timer spreading.

In order to spread the timers, in one embodiment the OS adjusts the expiry time of the timer, such that the adjusted expiry time is within a Timer Spread (TS) value of slots. The TS value is a measure of the variance of expiry times for a timer. In this embodiment, the OS sets the TS value.

Several different spreading mechanisms can be used. In one embodiment, a symmetric spreading mechanism is used. For symmetric spreading, it is necessary that TS be an even number of slots. Then, both the negative and positive spread are set to be equal, that is, they are both set to TS/2:

$$S_1=[(s+TS/2)] \text{modulo } N$$

$$S_2=[(s-TS/2)] \text{modulo } N$$

and if either $S_1$ or $S_2$ are equal to 0, then they are set to N where:

s is the slot in timer vector 201 that matches the remaining number of timer ticks for the timer;

TS is the allowable spread in OS timer ticks, and is an even number.

$S_1$ is the slot after applying the maximum positive spread $S_2$ is the slot after applying the maximum negative spread For example, if N=32, TS=4, and s=31, then $$S_1=[31+(4/2)] \text{modulo } 32=1$$

$$S_2=[31-(4/2)] \text{modulo } 32=29$$

Applying to the example of timer vector 201, then the timer would have been placed into slot 201-31 if the expiry time was unadjusted. Based on the above example, the expiry time of the timer will be adjusted so that the timer is then inserted in one of the slots from the set of available slots {201-29, 201-30, 201-31, 201-32, 201-1}. As will be seen below, several selection algorithms can be used to select a slot within the acceptable range obtained above.

In another embodiment, an asymmetric spreading mechanism can be used. In this case, different values can be used for the positive and negative offsets, that is:

$$S_1=(s+n_1) \text{modulo } N$$

$$S_2=(s-n_2) \text{modulo } N$$

and if either $S_1$ or $S_2$ are equal to 0, then they are set to N $$n_1, n_2 \geq 0$$

$$n_1+n_2=TS$$

where:

s is the slot in timer vector zero that matches the remaining number of timer ticks for the timer;

TS is the allowable spread in OS timer ticks, and it can be either even or odd.

$S_1$ is the slot after applying the maximum positive spread $S_2$ is the slot after applying the maximum negative spread $n_1$ is the maximum positive spread in OS timer ticks;

$n_2$ is the maximum negative spread in OS timer ticks;

For example, if N=32, s=31, $n_1$=2 and $n_2$=0 (TS=2)

$$S_1=(31+2) \text{modulo } 32=1$$

$$S_2=(31-0) \text{modulo } 32=31$$

Applying to the example of timer vector 201, then the timer would have been placed into slot 201-31 if the expiry time was unadjusted. Based on the above example, the expiry time of the timer will be adjusted so that the timer is then inserted in one of the slots from the set of acceptable slots {201-31, 201-32, 201-1}.

It can be seen that due to the nature of the modulo operation, sometimes the range of slots will "wrap around". For example in the case where N=32, s=31, $n_1$=2 and $n_2$=0

(TS=2), $S_1=1$. In another embodiment, $S_1$ and $S_2$ can be upper bounded by N and/or lower bounded by 1, that is:

$S_1=\min[N,(s+n_i)]$, and/or $S_2=\max[1,(s-n_2)]$

Then the set of available slots will be upper bounded by N and/or lower bounded by 1.

In another embodiment, each timer may have its own TS value. It is possible that a timer may have its own TS of 0, that is, the timer is not allowed to be shifted to a less busy spot.

Many techniques can be used to allocate timers to slots within the set of available slots. In one embodiment, timers are allocated to the slot in the set of available slots which has the lowest number of timers already assigned to it. For example, in the previous example where the set of acceptable slots is {201-29, 201-30, 201-31, 201-32, 201-1}, assume that slot 201-29 has 4 timers assigned, slot 201-30 has 5 timers assigned, slot 201-31 has 5 timers assigned, slot 201-32 has 5 timers and slot 201-1 has 6 timers assigned. A new timer will be assigned to slot 201-29 since it has the lowest number of timers already assigned to it. In the case of a tie, various tie breakers can be used, including but not limited to random selection, lowest index first and highest index first. In another embodiment, a timer can be allocated to a slot which is randomly selected from the set of available slots.

Figure 3:
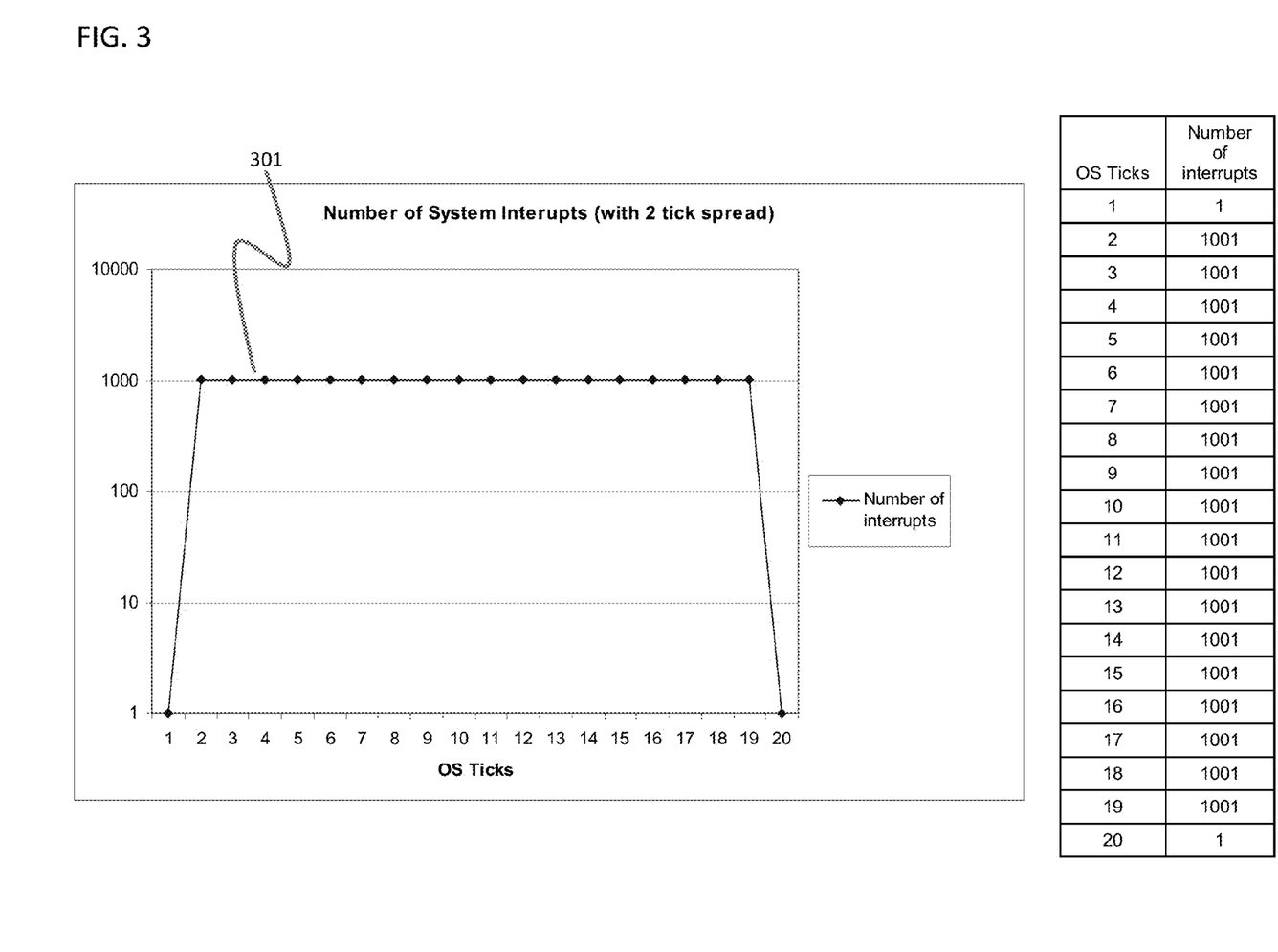
FIG. 3 illustrates a graphic example of evenly spread timer distribution using timer spreading.

FIG. 3 shows an example of even spreading of the timers from FIG. 1. As is shown in FIG. 3, using the techniques detailed above, the system will spread the number of interrupts 301 smoothly over time to 1001 interrupts per tick.

In order to preserve as much as possible the accuracy of the timer, TS should be in order of a "few" slots. In one embodiment, TS could be limited to a number of slots.

In one embodiment, the TS is constrained in the following manner: If the TS is applied to the ticks of a periodic timer, then the maximum negative spread is zero, and the upper bounding operation detailed above is used. Then, the resulting slot number should only be forward in time from its original unadjusted expiry time. This is needed when it is not acceptable to have a periodic timer elapse prior to its original unadjusted expiry time.

In another embodiment, the TS can be set so as that a periodic timer expires earlier than its original unadjusted expiry time.

When applying such an offset to spread the periodic timers, care is needed to avoid a cumulative jitter for the timer. In one embodiment, this is resolved by making sure that periodic timers are restarted at the unadjusted expiry time, although the actual triggering of the instance of the period timer will take place based on the specific slot where the instance of the periodic timer will be inserted.

In yet another embodiment, triggering and restart of the periodic timer occur at the same time, but only a certain amount of jitter is tolerated in either the positive or negative direction. In this case, the set of available slots will be upper and/or lower bounded depending on the jitter tolerance. In one embodiment, this jitter tolerance is set by the system. In another embodiment, this jitter tolerance is set by the application for which the timer is being used.

While the embodiments above have been described for a Timer Wheel, it is apparent that the spreading mechanisms described above can be used for other types of timers. When a timer is triggered, an OS can determine the expiry time in OS ticks for the timer. A Timer Spread can be set by the OS or the timer itself. In addition, if the timer is periodic, then the timer may have a jitter tolerance, which is set by the OS or an application. Additionally, there may be a requirement that the adjusted expiry time for the timer is later than the original expiry time. Finally, in the case of a periodic timer, the timer restart can be set so that it differs from the timer expiry, so that jitter accumulation does not occur, as explained previously.

Based on these requirements, the OS can calculate a set of available slots during which the timer can expire. It can then adjust the expiry time of the timer. In one embodiment, it adjusts the expiry time by analyzing the distribution of timer expirations in the set of available slots. It then selects the slot with the least timer expirations, and adjusts the expiry time so that the timer expires during the selected slot. In the case of a tie, various tie breakers can be used, including but not limited to random selection, lowest index first and highest index first. In another embodiment, it randomly selects a slot from the set of available slots.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of efficiently scheduling timer events within an operating system by allocating a plurality of timers to a set of available timer slots, each of said timers having an expiry time, comprising
   wherein said set of available timer slots is located in a timer wheel existing within said operating system, said timer wheel using a plurality of timer vectors arranged into successively increasing levels, beginning with level zero;
   defining a timer spread value which denotes the allowed variance of the expiry times of each of said timers,
   calculating a set of available timer slots for each of said timers based on said timer spread value, said calculating comprising
   applying a maximum positive spread and a maximum negative spread, and
      wherein the maximum positive spread and the maximum negative spread are equal to each other; and
   adjusting said expiry times of said timers so as to insert and spread said timers across said set of available timer slots.

2. The method of claim 1 wherein each timer vector contains a plurality of timer slots defined by a slot size based on the level of said timer vector, said timer slots being evenly spaced by a number of timer ticks corresponding with said slot size.

3. The method of claim 2 wherein the slot size for the lowest level timer vector is set to one, and the slot size for each successive higher level timer vector is based on the slot size of the level of the preceding timer vector.

4. The method of claim 1, wherein the plurality of timers includes at least one periodic timer.

5. The method of claim 4 further comprising restarting said periodic timer at the unadjusted expiry time.

6. The method of claim 1 wherein adjusting said expiry times further comprises selecting from said set of available timer slots a slot containing the fewest number of existing timers.

7. The method of claim 1 further comprising upper bounding said set of available slots, or lower bounding said set of available slots, or both.

8. The method of claim 1 wherein adjusting the expiry times further comprises selecting a timer slot randomly from said set of available slots.

9. A method of efficiently scheduling timer events within an operating system by allocating a plurality of timers to a set of available timer slots, wherein said set of available timer slots is located in a timer wheel existing within said operating system, said timer wheel using a plurality of timer vectors arranged into successively increasing levels, beginning with level zero, and each of said plurality timers having an expiry time;

said method comprising defining a timer spread value which denotes the allowed variance of the expiry times of each of said timers;

calculating a set of available timer slots for each of said timers based on said timer spread value, said calculating comprising applying a maximum positive spread and a maximum negative spread, and wherein the sum of the maximum positive spread and the maximum negative spread is equal to the defined timer spread value; and adjusting said expiry times of said timers so as to insert and spread said timers across said set of available timer slots.

10. The method of claim 9 wherein each timer vector contains a plurality of timer slots defined by a slot size based on the level of said timer vector, said timer slots being evenly spaced by a number of timer ticks corresponding with said slot size.

11. The method of claim 10 wherein the slot size for the lowest level timer vector is set to one, and the slot size for each successive higher level timer vector is based on the slot size of the level of the preceding timer vector.

12. The method of claim 9, wherein the plurality of timers includes at least one periodic timer.

13. The method of claim 9 wherein adjusting said expiry times further comprises selecting from said set of available timer slots a slot containing the fewest number of existing timers.

14. The method of claim 9 further comprising selecting a timer slot randomly from said set of available slots.

15. A method of efficiently scheduling timer events within an operating system by allocating a plurality of timers to a set of available timer slots, wherein said set of available timer slots is located in a timer wheel existing within said operating system, said timer wheel using a plurality of timer vectors arranged into successively increasing levels, beginning with level zero, each of said plurality of timers having a corresponding original unadjusted expiry time, and wherein the plurality of timers includes at least one periodic timer;

said method comprising defining a timer spread value which denotes the allowed variance of the expiry times of each of said timers;

calculating a set of available timer slots for each of said timers based on said timer spread value, comprising applying a maximum positive spread and a maximum negative spread, where the maximum negative spread is zero, and upper bounding said set of available slots; and adjusting said original unadjusted expiry times of said timers so as to insert and spread said timers across said set of available timer slots, and wherein said at least one periodic timer must not elapse earlier than the original unadjusted expiry time corresponding to said at least one periodic timer.

16. The method of claim 15 wherein each timer vector contains a plurality of timer slots defined by a slot size based on the level of said timer vector, said timer slots being evenly spaced by a number of timer ticks corresponding with said slot size.

17. The method of claim 16 wherein the slot size for the lowest level timer vector is set to one, and the slot size for each successive higher level timer vector is based on the slot size of the level of the preceding timer vector.

18. The method of claim 15 wherein adjusting said expiry times further comprises selecting from said set of available timer slots a slot containing the fewest number of existing timers.

19. The method of claim 15 further comprising lower bounding said set of available slots.

20. The method of claim 15 further comprising selecting a timer slot randomly from said set of available slots.

* * * * *